United States Patent
Ishida et al.

(10) Patent No.: US 6,706,304 B1
(45) Date of Patent: *Mar. 16, 2004

(54) GRANULAR SWEETENER

(75) Inventors: Hirotoshi Ishida, Kawasaki (JP); Takeshi Nagai, Kawasaki (JP); Tadashi Takemoto, Kawasaki (JP); Yuichi Suzuki, Kawasaki (JP)

(73) Assignee: Ajinomoto Co., Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/581,180

(22) PCT Filed: Nov. 20, 1998

(86) PCT No.: PCT/JP98/05236

§ 371 (c)(1),
(2), (4) Date: Aug. 8, 2000

(87) PCT Pub. No.: WO99/31999

PCT Pub. Date: Jul. 1, 1999

(30) Foreign Application Priority Data

Dec. 22, 1997 (JP) .............................. 9/352728

(51) Int. Cl.[7] .............................. A23L 1/236
(52) U.S. Cl. ................ 426/548; 426/453; 426/454; 426/658
(58) Field of Search ............... 426/548, 453, 426/454, 658

(56) References Cited

U.S. PATENT DOCUMENTS

| 4,158,068 A | 6/1979 | Von Rymon Lipinski et al. |
| 4,704,288 A | 11/1987 | Tsau et al. |
| 5,061,320 A | 10/1991 | Goodacre et al. |
| 5,164,214 A | 11/1992 | Wild |
| 5,473,097 A | 12/1995 | Kishimoto et al. |

FOREIGN PATENT DOCUMENTS

| HU | 216 320 | 6/1999 |
| JP | 01-211 468 | 6/1989 |
| JP | 04-346 769 | 11/1992 |
| WO | WO 96/20608 | 7/1996 |
| WO | 96/20608 | * 7/1996 |

OTHER PUBLICATIONS

Nalini Ayya, et al., Chemical Senses, vol. 17, No. 3, pp. 245–259, "Quantitative and Qualitative Evaluation of High–Intensity Sweeteners and Sweetener Mixtures", 1992.

Brian Lanton, Food Industries of South Africa, vol. 41, No. 2, pp. 23 and 25, "Recent Developments in Sweetener Synergies", Feb. 1988.

* cited by examiner

*Primary Examiner*—Leslie Wong
(74) *Attorney, Agent, or Firm*—Oblon, Spivak, McClelland, Maier & Neustadt, P.C.

(57) ABSTRACT

Herein is disclosed a granulated sweetener comprising Aspartame and Acesulfame-K as active ingredients, wherein the amount of the Acesulfame-K is 5 to 90% by weight based on the total amount of both the components and wherein the maximum particle size of the granules is about 1,400 μm or less, in which granulated sweetener the poorly dissoluble, high intense synthetic sweetener Aspartame (APM) is improved in solubility.

16 Claims, No Drawings

GRANULAR SWEETENER

This application is National Stage Filing of PCT/JP98/05236 filed Nov. 20, 1998.

TECHNICAL FIELD

The present invention relates to a highly soluble sweetener granule (i.e., granular sweetener or granulated sweetener) containing Aspartame (hereinafter abbreviated as "APM") and Acesulfame K (hereinafter abbreviated as "ACE-K") as active ingredients.

BACKGROUND ART

It is reported that the level of sweetness of APM which is an amino acid-based synthetic sweetener, is about 200 times that of sucrose in terms of weight ratio (Japanese Patent Application Publication (Kokoku) No. 31031/'72). When compared with sucrose which is regarded as a standard for evaluating sweetness characteristics, the profile of sweetness characteristics of APM is of such that it is weak in early taste (which means that the sweetener when placed in the mouth does not taste sweet so early as sucrose does), whereas it is strong in late taste (which means that the sweetener when placed in the mouth tastes sweet later than sucrose does). Accordingly, various approaches for the improvement of the sweetness profile of APM have been proposed mainly in terms of the late taste (for example, Japanese Patent Application Laid-open (Kokai) Nos. 148255/'81, 141760/'83, 220668/'83 and the like), and a method for obtaining a more natural sweetness profile which is closer to that of sucrose, for example, by using APM in combination with sucrose has been also proposed (Japanese Patent Application Laid-open (Kokai) No. 152862/'82).

On the other hand, ACE-K is also a synthetic sweetener having a sweetness level of about 200 times that of sucrose, like APM, but has such further poorer sweetness profile that it is strong in late taste, bitter taste, astringent taste, peculiar taste, and stimulation when compared with APM. Therefore, it has been subjected to various approaches for the improvement, including the use in combination with APM for improving the sweetness profile (U.S. Pat. No. 4,158, 068, and corresponding Japanese Patent Application Publication (Kokoku) No. 51262/'84). For example, the Japanese Patent Application Publication discloses the concurrent use of ACE-K and APM in a (weight) ratio of about 1:10 to 10:1, especially about 2:5 to 5:2, which, in turn, provides a sweetness profile closer to that of sucrose than that of either of the two.

Thus, various proposes have been made for improving the sweetness profile of APM, and each has been successful to some extent. Nevertheless, APM involves still such other problem concerning its solubility characteristics that an industrially produced APM powder (crystals) in difficult to dissolve in water (because it has a tendency to form agglomerates (in Japanese, dama) and therefore, is not smooth to dissolve, and even without that, it has a lower rate of dissolution, and the like). The poorer solubility (i.e., poorer dissolution speed) due to such agglomeration and the like leads to the reduction in the production efficiency of food products or beverages to be supplemented with APM for imparting sweetness thereto, including soft drinks, which is, in turn, greatly disadvantageous to the commercial production thereof.

Some approaches for improving the solubility of APM have been proposed, including a method of graining (granulation). However, these approaches are still not satisfactory, e.g., because the solubility needs further improving (Japanese Patent Application Laid-open (Kokai) No. 346769/'92, and the like) and because a relatively larger amount of an excipient should be used concomitantly (Japanese Patent Application Laid-open (Kokai) Nos. 126855/'74, 19965/'75, 150361/'82, and the like). Incidentally, the concurrent use of ACE-K with APM disclosed in the above-mentioned Japanese Patent application Publication (Kokoku) No. 51262/'84 is a concurrent use by merely mixing aqueous solutions of the two components (i.e., an aqueous ACE-K solution and an aqueous APM solution), and there is not made in the patent document any suggestion of the concurrent use of the two components, both in the form of granules, nor any mention of the solubility of either of the two in the granular form.

In view of the prior art discussed above, it is an object of the present invention to provide an excellent method for improving the solubility of APM.

DISCLOSURE OF THE INVENTION

The present inventors have made an effort to achieve the object described above and found unexpectedly that when APM is prepared in an admixture with ACE-K into granules, the resultant granules undergo no agglomeration and exhibit a higher dissolution rate as compared with granules consisting of APM alone, i.e., that the overall solubility is improved, thus establishing the present invention.

Accordingly, the present invention relates to a granulated sweetener comprising Aspartame and Acesulfame-K as active ingredients, wherein the amount of the Acesulfame-K is 5 to 90% by weight based on the total amount of both the components and wherein the maximum particle size of the granules is about 1,400 μm or less.

The present invention will now be further described in greater detail below.

(a) Solubility of Original Powders and Single-component Granules

An APM original powder, an ACE-K original powder and granules produced by the method of Example 1 described below were respectively put in a dissolution tester to determine the respective time periods required for dissolution.

In the case of APM, those granules having a maximum particle size of about 1,400 μm or less required shorter time period for dissolution, as compared with the original powder, i.e., a solubility-improving effect by such granulation was observed, whereas no solubility-improving effect by such granulation was obtained concerning the APM granules having a particle size exceeding about 1,400 μm. On the contrary, the original powder of ACE-K exhibited an extremely high solubility as it was, and such granulation provided no particular improvement in solubility to the ACE-K (See Experiment 1).

Incidentally, a granulated sweetner comprising APM and ACE-K as active ingredients and having an ACE-K content of 90% by weight or higher is not desirable because the bitter taste characteristic of ACE-K gets evident.

(b) Solubility of Granules of a Mixture (i.e., Granulated Mixture) and a Mixture of Granules Granules of a mixture of APM and ACE-K produced by the method of Example 1 (granules of mixture), and mixture of APM granules and ACE-K granules (mixture of granules) produced by the same method were respectively put in a dissolution tester to determine the time periods required for dissolution.

The results revealed that, insofar as the maximum particle size of the granules is 1,400 μm or less, the dissolution rate of the granules of a mixture is always larger than that of the mixture of granules, with the ACE-K content (% by weight of the ACE-K present in the granules of a mixture, and, % by weight of the ACE-K granules present in the mixture of granules) being the same and the particle size being the same, and that the difference in dissolution rate between the two becomes more remarkable as the ACE-K content is increased and as the granule particle size is decreased, i.e., the dissolution-promoting effect of ACE-K on APM becomes more evident (See Experiment 2). The improvement in solubility observed with the granule of a mixture was considered to be due to the granule dissolution/disintegration-promoting effect by ACE-K, in addition to the prevention thereby of agglomeration and the prevention thereby of the floating on the surface of water.

Incidentally, an ACE-K content of 5% by weight or less provides almost no dissolution-promoting effect by ACE-K, while that of 90% by weight or higher causes the bitter taste of the ACE-K to get evident, as has been discussed above.

Therefore, the solubility-improving effect by ACE-K according to the present invention can be achieved using granules of a mixture of APM and ACE-K in which the ACE-K content is 5 to 90% by weight and at the same time, the maximum particle size is about 1,400 $\mu$m or less. Granules having a maximum particle size of about 500 $\mu$m or less provides a further improvement in dissolution rate if the ACE-K content is 20 to 90% by weight. Also, dissolution rate can be markedly improved, using granules having a maximum particle size of about 1,400 $\mu$m or less and at the same time, having an ACE-K content of 50 to 90% by weight.

APM granules having an improved solubility as a result of admixture of ACE-K, i.e., the inventive granulated sweetener, can be produced by a known method. For example, a dry granulating process and also a wet granulating process can be employed. Specifically, granulation can be carried out by various methods such as mixing granulation, compacting granulation, extrusion granulation, fluidization granulation, rotation granulation, pulverization granulation, spray coating, tabletting or the like. However, for the purpose or less heat load and less complicated manufacturing process, it is commercially advantageous to employ a dry granulation process such as compacting granulation.

The inventive granulated sweetener can, depending on its use, contain a diluent or an excipient such as a sugar alcohol, an oligosaccharide and a dietary fiber as well as other high intense synthetic sweetener(s) such as Alitame, Saccharin, 3,3-dimethylbutylaspartylphenylalanine methylester and the like, like in the case of conventional intense synthetic sweetener compositions, for the purpose of obtaining a better handling or improving the sweetness profile, as long as the improved solubility of APM according to the present invention is not affected adversely. A diluent or an excipient referred to herein includes a low intense sweetener such as sucrose, glucose and the like.

It is known that APM can be improved in solubility by means of granulation (Japanese Patent Application Laid-open (Kokai) No. 346769/'92, referred to above). On the other hand, ACE-K exhibits an extremely high solubility even in the form of an original powder, and exhibits no improvement in solubility even if granulated (as found by the present inventors). Therefore, if APM and ACE-K are to be used concurrently for some purpose, it would usually occur to those skilled in the art to place APM granules and an ACE-K original powder separately but concurrently in water, and it is difficult for those skilled in the art to expect that granules of a mixture of APM and ACE-K are dissolved more rapidly than when APM granules and an ACE-K original powder are placed separately but concurrently in water, and it is even more difficult to expect that APM can be improved in solubility by preparing it into granules of a mixture with ACE-K.

From the fact that an APM original powder, if granulated, can be improved in solubility, by agglomeration in a liquid being avoided, it could only occur to those skilled in the art that an APM original powder, if mixed with ACE-K and granulated, does not agglomerate and has the same solubility as granules consisting of APM alone. Increased solubility of AMP when granulated in admixture with ACE-K as compared with granules composed only of APM is considered to be due to the simultaneous exertion of the disintegrating effect by ACE-K on granules having a larger particle size and the aggregation-preventing effect by ACE-K on granules having a smaller particle size, both of which are attributable to the addition of ACE-K.

The solubility of APM granules (i.e., granules consisting of APM alone) is just less unsatisfactory than that of an AMP original powder, and further improvement of the solubility is demanded by users. In accordance with the present invention, such further improvement of the solubility of APM has been realized, and also an excellent sweetener can be produced in which the sweetness profiles of both of APM and ACE-K are improved. While it would seem to those skilled in the art that a binder is considered to be essential for mixing and granulating APM together with ACE-K which is difficult to be integrated alone, APM serves as a binder unexpectedly in accordance with the present invention, whereby granulation of pure two components has been realized. A pure two-component sweetener composed only of ACE-K and APM, and containing no binder, diluent or excipient, can be extremely useful especially for beverage use.

BEST MODE FOR CARRYING OUT THE INVENTION

The present invention will be further described with reference to the following Experiments and Example.

Experiment 1 (Solubility of Original Powders and Single-component Granules)

A 1 L dissolution tester (the Japanese Pharmacopoeia, Paddle method (container of 100 mm in inner size, 160 mm in height, having a hemispheric bottom of 50 mm in radius, and a net volume of 1,000 ml; paddle formed by sectioning a disc of 83 mm in size, and 3 mm in thickness, with parallel strings of 42 mm and 75 mm in length; 25 mm in distance between the lower end thereof and the container bottom), 100 rpm) was used together with 900 ml of water (20° C.), in which 1 g of a sample was placed and examined for the time period required for dissolution (the endpoint being judged visually).

An APM original powder (average particle size being about 15 $\mu$m, and maximum particle size being about 100 $\mu$m; IB-type bundle-like crystals) and an ACE-K original powder (average particle size being about 250 $\mu$m, and maximum particle size being about 500 $\mu$m) were used as samples directly as they were and after granulated according to the method of Example 1, followed by sieving into various mesh size fractions.

The samples exhibited respectively time periods (min) required for dissolution indicated in Table 1 shown below.

TABLE 1

Time period for dissolution (min)

| Sample particle size | APM | ACE-K |
|---|---|---|
| Original powder | 30 | 3 |
| Granule 500 to 1,400 μm | 32 | 3 |
| 300 to 500 μm | 18 | 2 |
| 100 to 300 μm | 18 | 2 |
| to 100 μm | 29 | 3 |

Experiment 2 (Solubility of Granules of a Mixture and a Mixture of Granules)

Like in Experiment 1, the time periods required for dissolution of the granules were determined. The sample granules of mixtures were prepared by the method of Example 1 described below, using the same original powders as employed in Experiment 1. The sample mixtures of the granules were prepared by mixing APM granules of a certain particle size and ACE-K granules of a certain particle size as referred to in Experiment 1 at a certain ratio. 1 g of each sample was used in each trial.

In greater detail, as shown typically in the following Table 2, granules of mixtures of APM and ACE-K (granules of mixture) and mixtures of APM granules and ACE-K granules (mixture of granules) were subjected to the determination of the time period required for dissolution, with the mixing ratio (ACE-K content) and the particle size being varied. Incidentally, a mixture of granules was obtained by mixing APM granules and ACE-K granules gently with a spatula. The results will be shown in the same table.

TABLE 2

Time periods for dissolution (min)

| Ratio of ACE-K present (% by weight) Particle size (μm) | 5 (*1) Granules of mixture | Mixture of granules | 20 Granules of mixture | Mixture of granules | 50 (*2) Granules of mixture | Mixture of granules | 90 (*3) Granules of mixture | Mixture of granules |
|---|---|---|---|---|---|---|---|---|
| 500 to 1,400 | | | 24 | 31 | | | | |
| 300 to 500 | 26 | 32 | 11 | 17 | 14 | 27 | 4 | 24 |
| 100 to 300 | | | 4 | 18 | | | | |
| to 100 | | | 5 | 27 | | | | |

*1,2,3 = Values in these columns were of a non-sieved granules of a mixture or a mixture of granules.

Example 1 (Preparation of Granules of a Mixture of APM and ACE-K)

The same ACE-K as employed in Experiment 1 (average particle size being about 250 μm and maximum particle size being about 500 μm) was pulverized by a compact laboratory centrifugal pulverizer (250 μmφscreen, 20,000 rpm) to obtain a pulverized ACE-K product whose average particle size was about 20 μm and whose maximum particle size was about 250 μm.

This pulverized ACE-K product was mixed with the same APM as employed in Experiment 1 (average particle size being about 15 μm, and maximum particle size being about 100 μm) at various ratios and each resultant mixture was granulated using a dry roll mill (dry compaction and disintegration) and sieved to obtain fractions of granules of the mixture of APM and ACE-K having a varying particle size. Specifically, the dry compaction and the dry disintegration were performed using a compacting machine "ROLLER COMPACTER Model WP90 X 30" (ex TURBO KOGYO), and the mixture was, upon compaction, fed to the compacting machine via a screw feeder (88 rpm) under a roll pressure of 4.9 Mpa at a roll speed of 12 rpm, and then disintegrated using a fine granulator screen of 12 mesh size (pore size being 1,400 μm). The granules were sieved using a JIS (Japanese Industrial Standard) standard sieve.

The granules of the mixtures of APM and ACE-K having various mixing ratios and various particle sizes thus obtained were used for the test in Experiment 2 described above.

Industrial Applicability

By mixing and granulating Aspartame (APM) and Acesulfame-K (ACE-K) according to the invention, the poor solubility (i.e., poor dissolution speed) of APM can be improved markedly, and a sweetener having an excellent sweetness profile can readily be prepared.

What is claimed is:

1. A sweetener comprising granules of an admixture comprising Aspartame and Acesulfame-K as active ingredients, wherein the amount of the Acesulfame-K is 5 to 90% by weight based on the total amount of both components and wherein the maximum particle size of the granules is about 1,400 μm or less and wherein said sweetener exhibits a rate of dissolution in water which is greater than that exhibited by granules of Aspartame alone.

2. The sweetener according to claim 1, wherein said amount of the Acesulfamne-K is 50 to 90% by weight.

3. The sweetener according to claim 1, wherein said amount of the Acesulfayne-K is 20 to 90% by weight and wherein said maximum particle size of the granules is about 500 μm or less.

4. The sweetener according to claim 1, wherein said sweetener exhibits a rate of dissolution in water which is greater than that exhibited by a mixture of Aspartame powder and Acesulfame-K powder, wherein said mixture of Aspartame powder and Acesulfarme-K powder contains Aspartame and Acesulfame-K in the same relative amounts as said sweetener.

5. The sweetener according to claim 2, wherein said sweetener exhibits a rate of dissolution in water which is greater than that exhibited by a mixture of Aspartame powder and Acesulfame-K powder, wherein said mixture of Aspartame powder and Acesulfame-K powder contains Aspartame and Acesulfame-K in the same relative amounts as said sweetener.

6. The sweetener according to claim 3, wherein said sweetener exhibits a rate of dissolution in water which is greater than that exhibited by a mixture of Aspartame powder and Acesulfamne-K powder, wherein said mixture of Aspartame powder and Acesulfame-K powder contains Aspartame and Acesulfame-K in the same relative amounts as said sweetener.

7. The sweetener according to claim 1, wherein said sweetener does not contain a binder.

8. The sweetener according to claim 2, wherein said sweetener does not contain a binder.

9. The sweetener according to claim 3, wherein said sweetener does not contain a binder.

10. The aged sweetener according to claim 1, wherein said sweetener is prepared by:
   (1) forming a mixture of Aspartame and Acesulfame-K; and
   (2) granulating said mixture of Aspartame and Acesulfame-K by compacting granulation.

11. The sweetener according to claim 2, wherein said sweetener is prepared by:
   (1) forming a mixture of Aspartame and Acesulfamne-K; and
   (2) granulating said mixture of Aspartame and Acesulfame-K by compacting granulation.

12. The sweetener according to claim 3, wherein said sweetener is prepared by:
   (1) forming a mixture of Aspartame and Acesulfame-K; and
   (2) granulating said mixture of Aspartame and Acesulfame-K by compacting granulation.

13. The sweetener according to claim 1, which further comprises a diluent or excipient.

14. The sweetener according to claim 13, wherein said diluent or excipient is selected from the group consisting of sucrose, glucose, and mixtures thereof.

15. The sweetener according to claim 1, which further comprises another synthetic sweetener.

16. The sweetener according to claim 15, wherein said another synthetic sweetener is selected from the group consisting of Alitame, Saccharin, 3,3-dimethylbutylaspartylphenylalanine, and mixtures thereof.

* * * * *

UNITED STATES PATENT AND TRADEMARK OFFICE
CERTIFICATE OF CORRECTION

PATENT NO. : 6,706,304 B1  Page 1 of 1
DATED : March 16, 2004
INVENTOR(S) : Ishida et al.

It is certified that error appears in the above-identified patent and that said Letters Patent is hereby corrected as shown below:

Title page,
Item [86], PCT No., should read:
-- [86] PCT No.:   PCT/JP98/05236
        § 371 (c) (1),
        (2), (4) Date: Jul. 14, 2000 --

Signed and Sealed this

Twenty-first Day of June, 2005

JON W. DUDAS
*Director of the United States Patent and Trademark Office*